US012670622B2

(12) United States Patent
Maley

(10) Patent No.: US 12,670,622 B2
(45) Date of Patent: Jun. 30, 2026

(54) SYSTEM AND METHODS FOR MITIGATING SENSOR INTERFERENCE USING ON-SENSOR FIELD-OF-VIEW ANALYTICS

(71) Applicant: Caterpillar Inc., Peoria, IL (US)

(72) Inventor: Jacob C. Maley, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 301 days.

(21) Appl. No.: 18/600,397

(22) Filed: Mar. 8, 2024

(65) Prior Publication Data

US 2025/0285327 A1     Sep. 11, 2025

(51) Int. Cl.
| | |
|---|---|
| *G06T 7/00* | (2017.01) |
| *G06T 7/20* | (2017.01) |
| *G06T 7/70* | (2017.01) |
| *G06T 7/80* | (2017.01) |
| *H04N 17/00* | (2006.01) |

(52) U.S. Cl.
CPC ................. *G06T 7/80* (2017.01); *G06T 7/20* (2013.01); *G06T 7/70* (2017.01); *H04N 17/002* (2013.01)

(58) Field of Classification Search
CPC .... G06T 7/80; G06T 7/20; G06T 7/70; H04N 17/002; E02F 9/264; E02F 9/267; E02F 9/261
See application file for complete search history.

(56) References Cited

U.S. PATENT DOCUMENTS

| | | | |
|---|---|---|---|
| 11,144,889 B2 | 10/2021 | Li et al. | |
| 11,479,213 B1 * | 10/2022 | Kentley-Klay | ........ G06V 20/56 |
| 11,908,100 B2 * | 2/2024 | Liu | ........... G06T 7/55 |
| 2019/0024348 A1 * | 1/2019 | Hiekata | .................. E02F 9/267 |
| 2019/0037148 A1 * | 1/2019 | Kowatari | ............ H04N 23/635 |
| 2019/0347494 A1 * | 11/2019 | Gerardo Castro | ..... G06V 20/58 |
| 2022/0148221 A1 | 5/2022 | Wagner et al. | |

(Continued)

FOREIGN PATENT DOCUMENTS

| | | |
|---|---|---|
| CN | 113177944 B | 9/2021 |
| JP | 7104452 B1 | 7/2022 |

(Continued)

OTHER PUBLICATIONS

Written Opinion and International Search Report for Int'l. Patent Appln. No. PCT/US2025/016232, mailed May 28, 2025 (11 pgs).

*Primary Examiner* — Van D Huynh

(57) ABSTRACT

Systems and methods are disclosed herein for mitigation of sensor obstructions or interference. The system can generate a first sensor map using a first sensor and a second sensor map using a second sensor. The system can detect a first representation of a first object in the first sensor map. The system can obtain first field-of-view information associated with the first sensor and second field-of-view information associated with the second sensor. The system can generate a prediction for an object position of the first object. The system can determine, in the second sensor map, a predicted sensor cell for the first object. The system can determine that the second sensor map does not include a second representation of the object. The system can generate a sensor operation status for the second sensor. The system can execute an interference diagnostic program according to the sensor operation status.

20 Claims, 11 Drawing Sheets

(56)                    References Cited

U.S. PATENT DOCUMENTS

| | | | |
|---|---|---|---|
| 2022/0185331 A1* | 6/2022 | Kaiser | B60W 50/0205 |
| 2022/0205224 A1* | 6/2022 | Koga | E02F 9/24 |
| 2023/0294726 A1* | 9/2023 | Akbarzadeh | G01S 17/931 |
| | | | 701/23 |
| 2024/0310838 A1* | 9/2024 | Calleija | G05D 1/0246 |
| 2025/0020761 A1* | 1/2025 | Donderici | G01S 13/931 |

FOREIGN PATENT DOCUMENTS

| | | | |
|---|---|---|---|
| WO | 2021054416 A1 | 3/2021 | |
| WO | 2023275691 A1 | 1/2023 | |

* cited by examiner

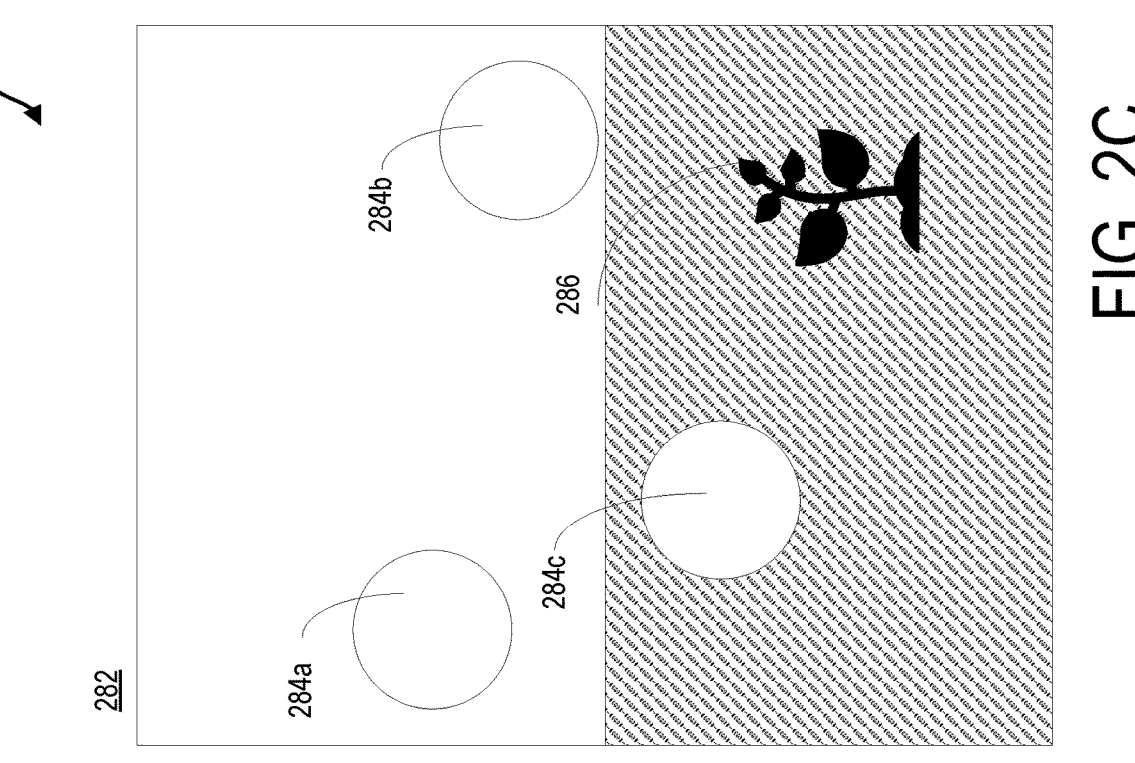
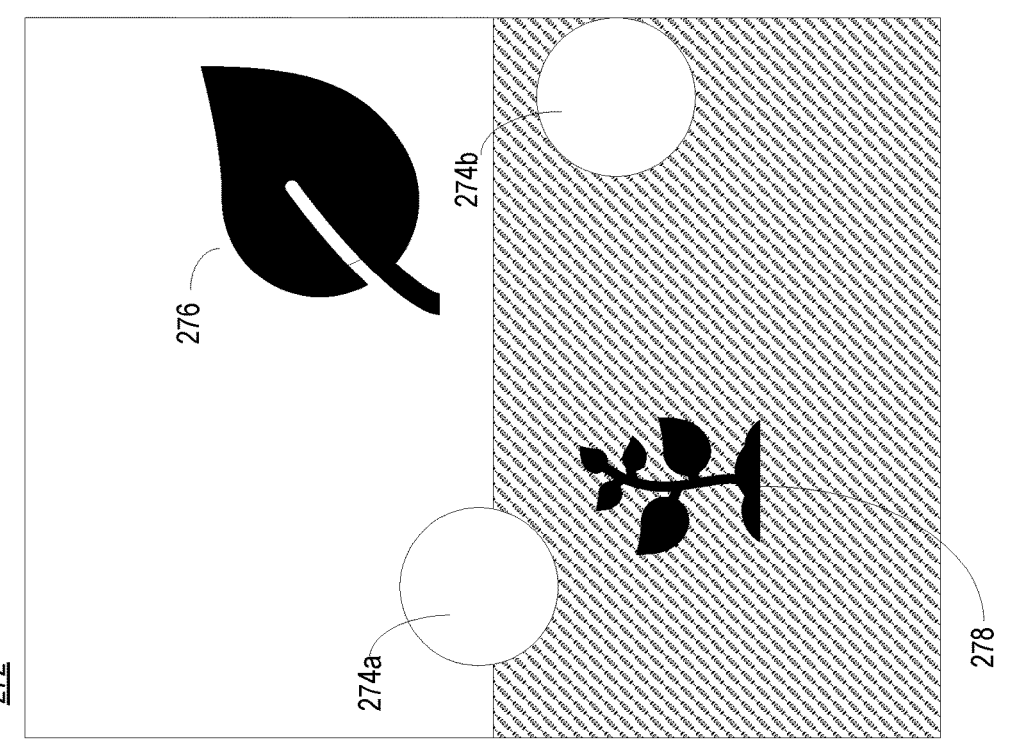
FIG. 2C

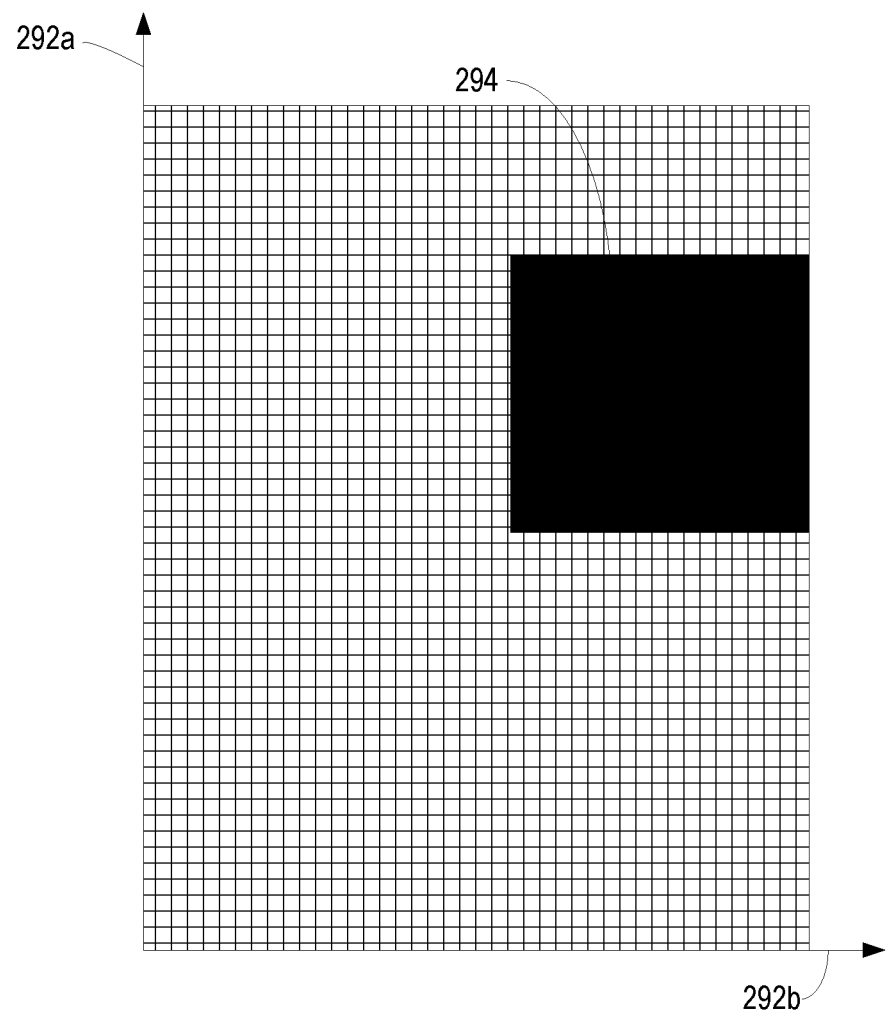
FIG. 2D

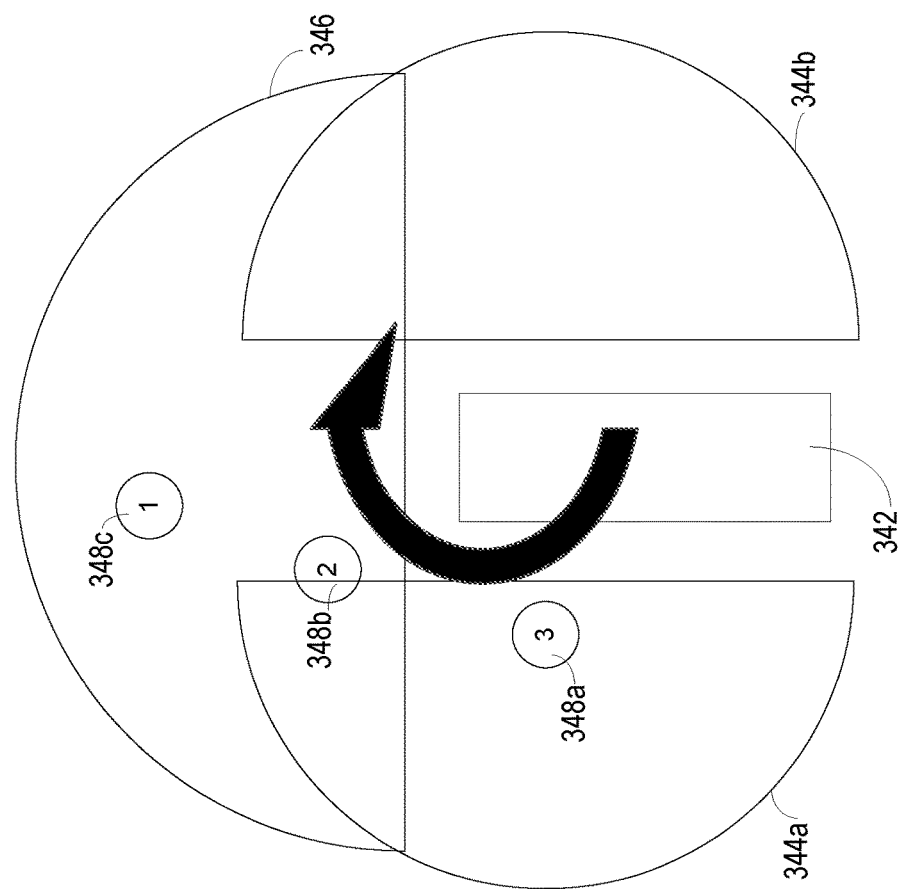
FIG. 3C

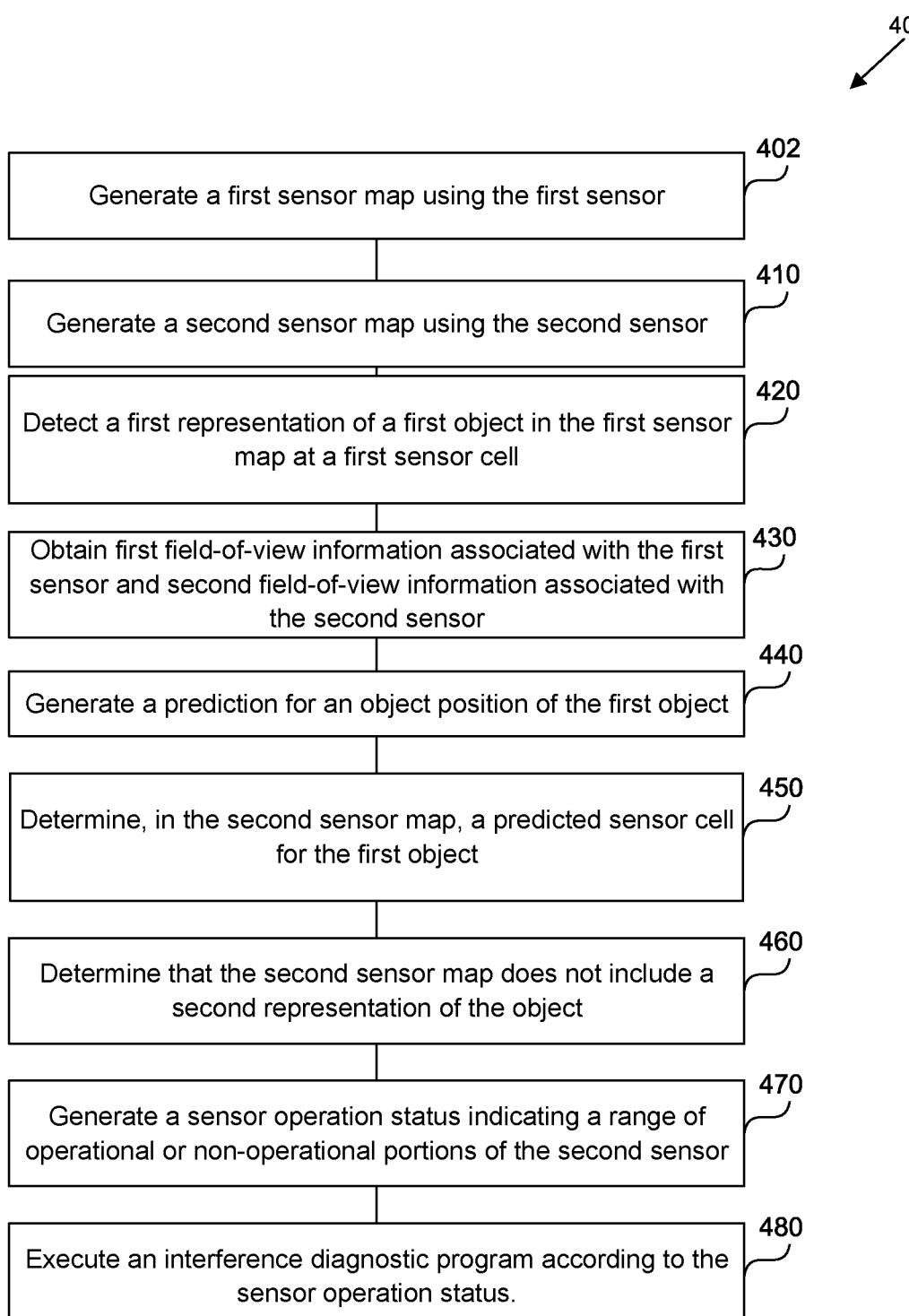

400

402
Generate a first sensor map using the first sensor

410
Generate a second sensor map using the second sensor

420
Detect a first representation of a first object in the first sensor map at a first sensor cell 430
Obtain first field-of-view information associated with the first sensor and second field-of-view information associated with the second sensor 440
Generate a prediction for an object position of the first object 450
Determine, in the second sensor map, a predicted sensor cell for the first object 460
Determine that the second sensor map does not include a second representation of the object 470
Generate a sensor operation status indicating a range of operational or non-operational portions of the second sensor 480
Execute an interference diagnostic program according to the sensor operation status.

SYSTEM AND METHODS FOR MITIGATING SENSOR INTERFERENCE USING ON-SENSOR FIELD-OF-VIEW ANALYTICS

BACKGROUND

An image sensor or imager is a sensor that detects and conveys information used to form an image. It does so by converting the variable attenuation of light waves (as they pass through or reflect off objects) into signals, which are small bursts of current that convey the information. The waves can be light or other electromagnetic radiation. Image sensors are used in electronic imaging devices of both analog and digital types, which include digital cameras, camera modules, camera phones, optical mouse devices, medical imaging equipment, night vision equipment such as thermal imaging devices, radar, sonar, and others. As technology changes, electronic and digital imaging tends to replace chemical and analog imaging.

SUMMARY

Methods and systems for mitigating sensor interference in an industrial machine are disclosed herein. For example, the disclosed signal evaluation platform enables on-board and/or remote evaluation of sensor readings from multiple sensors (e.g., multiple cameras) associated with industrial machines for detection, notification, and mitigation of sensor interference. To illustrate, the system can detect the presence of blockages (e.g., leaves or dirt blocking a portion of a sensor) by comparing sensor maps associated with various sensors of a given industrial machine (e.g., an excavator). For example, the sensors can be removably or non-removably coupled to a component of an industrial machine, disposed/mounted on a component of an industrial machine, or otherwise associated (e.g., communicatively coupled in wireless or wired fashion) with a controller of an industrial machine.

Sensors mounted on heavy equipment are typically exposed to dust, dirt, and debris, which can accumulate on components of a particular sensor (e.g., on the camera lens), thereby preventing reliable sensor readings. For example, mud can cover a portion of a camera lens associated with an excavator, thereby preventing detection of people or objects around the machine. Detection of such blockages ordinarily requires manual reporting by operators who notice discrepancies between direct observations and sensor-based observations. Such direct observations can be challenging or impossible during adverse environmental conditions (e.g., during adverse weather or at night). As such, it is desirable to effectively and accurately detect blockages or interference with respect to sensors, which reduces dangers to people, animals, and objects in the vicinity of the equipment.

The signal evaluation platform disclosed herein enables mitigation of sensor interference through parallel (e.g., overlapping in time and/or in steps performed) detection of objects across various sensors (e.g., cameras) associated with the equipment. The equipment can include rotary components, and the sensors can be mounted at various parts of the equipment to capture a comprehensive picture of surroundings (e.g., by positioning the sensors such that their fields of view only partially overlap).

As an illustrative example, described herein is a signal evaluation platform that captures (receives) a first image (e.g., a pixelated image) associated with a first camera attached to an excavator, as well as a second image associated with a second camera. Based on the first image, the signal evaluation platform can detect an object (e.g., a person, a plant, or another object) within a region of this sensor map, such as through an image recognition algorithm. The signal evaluation platform can extract field-of-view information relating to the first sensor and the second sensor to predict where the object is expected to appear within the second image. In some implementations, the system is an on-board system. In some implementations, at least some operations of the system take place off-board (e.g., at a computing system or processor that is separate and/or remote relative to the industrial machine and is communicatively coupled to the industrial machine).

The platform can automatically determine whether the object indeed appears in the expected location within this second image. Based on this determination, the platform can generate a sensor operation status that indicates regions of the second sensor that are expected to be faulty, defective, and/or obstructed based on the detected presence or absence of the object in the expected location. The signal evaluation platform can determine to execute an interference mitigation program (e.g., an operation capable of notifying an operator of the obstruction and/or capable of clearing the obstruction), thereby enabling efficient, accurate, and effective mitigation of sensor obstructions.

By enabling prompt detection, evaluation, and mitigation of obstructions or faults in sensor images using evaluation of multiple sensors' outputs, the platform enables notification and addressing of deficiencies or defects within sensors in an efficient, accurate manner. For example, the signal evaluation platform can notify an operator of the deficiency, enabling the operator to check for any obstructions or objects around the equipment that can be missed due to the deficiency. In some implementations, the signal evaluation platform can execute one or more interference mitigation operations that can cause the physical removal of the given obstruction (e.g., by causing execution of a program that cleans or wipes the sensor lens). As such, the signal evaluation platform improves the safety and efficacy of sensor systems for heavy machinery by improving the detection of sensor obstructions or faults through the reconciliation of multiple sensors' outputs.

BRIEF DESCRIPTION OF THE DRAWINGS

Detailed descriptions of implementations of the present invention will be described and explained through the use of the accompanying drawings.

FIG. 2C shows an example of generated sensor maps for sensors with different fields of view.

FIG. 2D shows an example of a region of cells associated with sensor interference based on the sensor maps of FIG. 2C.

FIG. 3C shows a schematic of a mobile industrial machine with two sensors and a detected mobile object.

FIG. 4 shows a flowchart of a method for mitigating signal interference using the signal monitoring system and signal evaluation platform of FIG. 2A.

Figure 1:
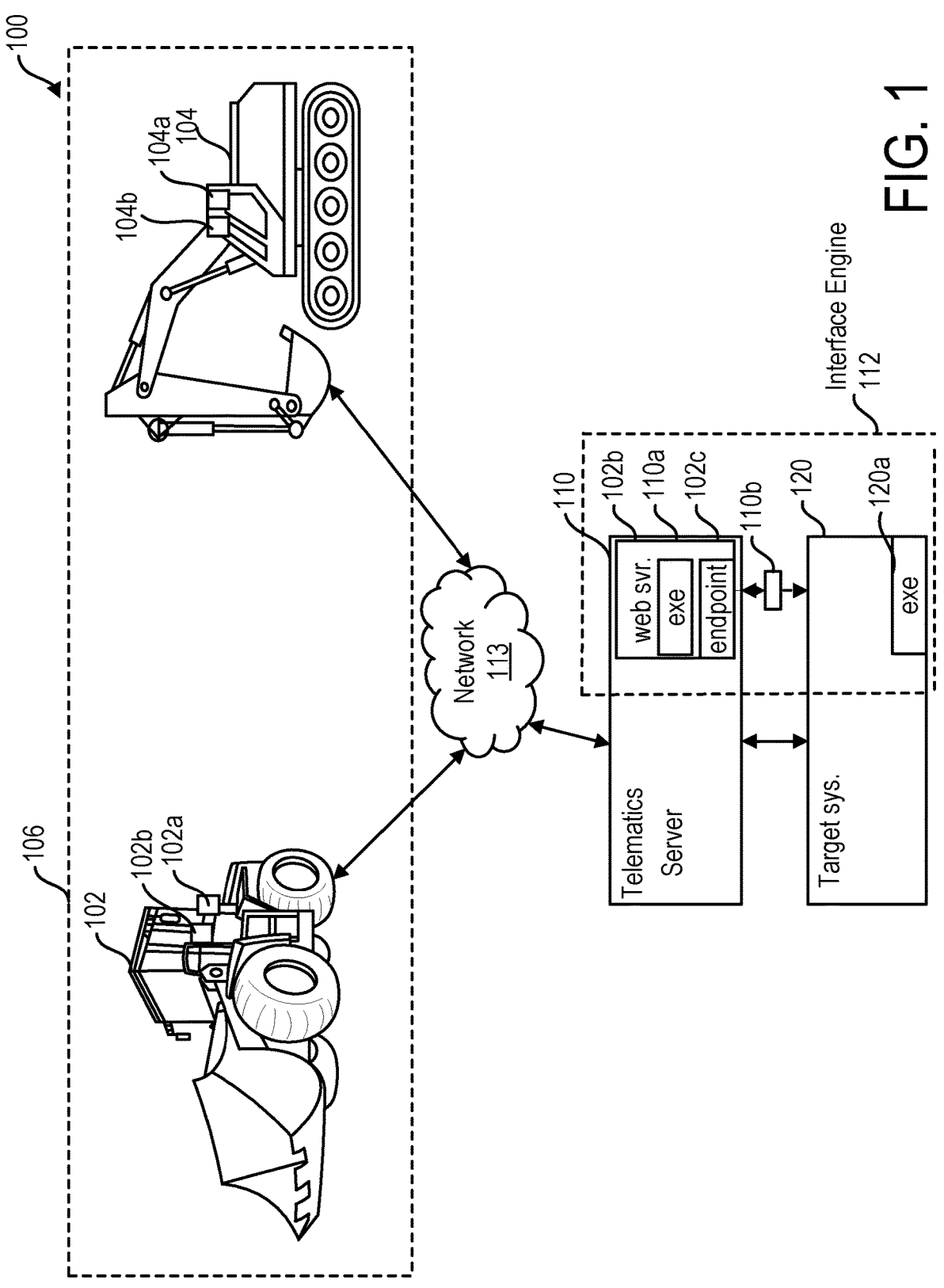
FIG. 1 shows an example ecosystem for monitoring of vehicles and machinery.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

As used herein, the term "set" refers to a physical or logical collection of objects, which can contain no objects (e.g., a null set, an empty set), one object, or two or more objects. The terms "engine", "application", and "executable" refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations, as defined by parametrized functions, specific configuration settings, special-purpose code, and/or the like. Engines, applications, and executables can generate and/or receive various electronic messages.

Monitoring Ecosystem

FIG. 1 shows an example ecosystem 100 for monitoring of various assets, such as vehicles and machinery. In operation, the one or more assets (102, 104) can generate operating data captured by various sensors (102a, 104a). In some implementations, the operating data is processed on-board. In some implementations, the operating data can be transmitted, via the network 113, to one or more telematics servers 110, which can generate API messages 110b to transmit the operating data, in original or modified form, to various target computing system(s) 120. The target computing system(s) 120 can use the received data as training data (e.g., for AI/ML systems), for analytics relating to operating conditions of the assets (102, 104) and so forth.

One or more types of assets (102, 104) can be included in a particular fleet 106. The assets (102, 104) in the particular fleet 106 can be associated with one or more original equipment manufacturer (OEM). The assets (102, 104) can include various mobile machinery items, such as earth moving machinery, mobile construction machinery and so forth, which perform various tasks, such as excavation, loading, transportation, drilling, spreading, compacting, and/or trenching of earth, rock and other materials and can be deployed for work on roads, in quarries, in mines and so forth. Accordingly, the assets (102, 104) can include dozers, loaders (swing loaders, skid-steer loaders, backhoe loaders, and so forth), excavators, trenchers, dumpers, scrapers, graders, landfill compactors, rollers, pipelayers, drills, tool carriers, drainage pipe layers, ploughs, mixers (e.g., concrete mixers) and so forth. The assets (102, 104) can be individual machines or combinations of devices (e.g., combinations of base machines and equipment or attachments, such as augers, buckets, blades, tillers, forks, rakes, trenchers, shears, compactors, pulverizers, and so forth) where the combinations can be identified by a product identification number (PIN), machine serial number, or another identifier. According to various implementations, the assets (102, 104) can be direct-controlled devices (e.g., devices controlled by an operator in physical contact with the device) and/or self-propelled devices. The assets (102, 104) can be ride-on devices, non-riding direct-controlled devices, non-riding remote controlled devices, mobile remote-controlled devices, and so forth. The assets (102, 104) can be wire-controlled and/or wireless-controlled.

Assets (102, 104) generate and report various items of information. To generate and report the information, assets (102, 104) can each include a set of sensors (102a, 104a) and a set of controllers (102b, 104b). The sensors (102a, 104a) are configured to enable monitoring a variety of operating conditions, including real-time operating conditions of the assets (102, 104) and real-time operating conditions for asset components (e.g., engine, attachments, surroundings, operating environment and so forth). The sensors (102a, 104a) can collect operating data, which can be interpreted on-board and/or transmitted by the controllers (102b, 104b), via the network 113, to one or more telematics servers 110. The network 113 can operate according to one or more wired or wireless protocols, such as Wi-Fi, cellular, radio, satellite, Bluetooth, ZigBee, etc. To enable transmission of data and traffic management, the network 113 can include connectivity equipment, such as modems, Bluetooth transceivers, Bluetooth beacons, RFID transceivers, NFC transmitters, and the like. In some implementations, the network 113 can include a controller area network (CAN) of a particular asset (102, 104).

The sensors (102a, 104a) can provide analog readings and/or digital readings. The information provided by the sensors can be used to perform on-board and/or remote diagnostics of the assets (102, 104) and can relate to various operating parameters of the assets (102, 104). According to various implementations, the sensors (102a, 104a) can include radar components, lidar components, cameras, ultrasonic devices, GPUs (global positioning units) and/or other suitable components. The sensors can include components that provide two-dimensional (2D) or three-dimensional (3D) maps, readings, or information. For example, a sensor can include a camera capable of capturing light and/or other electromagnetic radiation through pixels (e.g., as in the case of a charge-couple device (CCD)). For example, a sensor includes a 2D arrangement of pixels (e.g., "cells"), each of which is capable of recording one or more signals (e.g., associated with photons of a particular range of wavelengths). In some implementations, the assets include multiple such sensors, thereby enabling the signal evaluation platform to generate a 3D mapping of objects in the vicinity of the assets.

The controllers (102b, 104b) can activate, operate, and/or control sensors (102a, 104a), fuse the readings of multiple sensors (102a, 104a), convert analog values to digital values, generate electronic messages containing sensor readings, and/or transmit sensor readings, via the network 113, to one or more telematics servers 110. The controllers (102b, 104b) can include hardware and/or software circuitry and can be associated with particular components of assets (102, 104). For instance, controllers (102b, 104b) can include engine control units (ECUs) that control engine operations. In other examples, controllers (102b, 104b) can include powertrain control modules (PCMs), brake control modules (BCMs), door control units (DCU) s, speed control units (SCUs), transmission control modules (TCMs), battery management systems (BCMs), telematics control units (TCUs), and so forth.

An example controller (102b, 104b) can be an electronic controller. The elements of an electronic controller (102b, 104b) can include, for instance, a processor/microcontroller, memory (e.g., SRAM, EEPROM, Flash), input devices (supply voltage and ground, digital input devices, analog input devices), output devices (actuator drivers, such as injectors, relays, valves), logic outputs, communication circuitry and equipment (CAN transceivers, Ethernet transceivers, including wired and wireless communication components), and various embedded software modules (boot loaders, metadata, configuration data). Accordingly, in some implementations, controllers (102b, 104b) can be structurally and/or communicatively integrated with sensors (102a, 104a). For instance, in an example where a particular controller (102b, 104b) is a TCU structured to collect, pre-process, and/or transmit telematics data, the controller (102b, 104b) can include a navigation unit (sensor (102a, 104a) that keeps track of the latitude and longitude of the asset (102, 104)), a mobile communication transceiver (e.g., GSM, GPRS, Wi-Fi, WiMax, LTE or 5G), a memory, a processor, and/or a battery module and/or another power source (e.g., an interface to the power system of the asset (102, 104)). One or more communicatively coupled controllers (102b, 104b) can perform signal monitoring operations on-board of the industrial machine and/or can coordinate transmission of sensor data and/or data processing instructions to other systems, such as the telematics server 110.

In some implementations, controllers (102b, 104b) can include edge computing features and can pre-process data from sensors (102a, 104a) by, for example, generating data averages, discarding data outliers, discarding repeated sensor data via periodic sampling, and so forth. In some implementations, the controllers (102b, 104b) can provide raw sensor data to the telematics server 110, which can perform edge computing operations by the executable 110a prior to transmitting the sensor data to the target computing system(s) 120. In some implementations, the controllers (102b, 104b) are integrated with the telematics server 110. For example, the controllers (102b, 104b) can include the executable 110a, and/or multiple executables 110a can be distributed across a particular controller (102b, 104b) and telematics server 110. In some implementations, the operations described herein can be performed, in whole or in part, at the controllers (102b, 104b).

In some implementations, the controllers (102b, 104b) can perform additional (e.g., increased-complexity) data processing operations, such as generating virtual sensor values using information provided by multiple types of sensors (102a, 104a). In an example use case, autonomous and/or semi-autonomous assets (102, 104) can benefit from comprehensive scene understanding accomplished by fast and reliable object recognition and accurate position detection for various components and attachments of a particular asset (102, 104).

To that end, the controllers (102b, 104b) can combine information from various sensors. For example, the controllers (102b, 104b) can combine raw reflection data from lidar, radar, and/or ultrasonic sensors (102a, 104a) with raw frame data from camera sensors (102a, 104a) and/or additional data to more accurately estimate a distance from a particular surface point on the asset (102, 104) or its attachment to the object photographed by the camera. In some examples, the additional data can be collected by a set of inertial movement unit (IMU) sensors (102a, 104a) and can include, for example, multi-axial acceleration data collected via accelerometer(s) of the IMU and/or multi-axial velocity data collected via gyroscope(s) of the IMU. In some examples, the additional data can include multi-axial translational movement data (surge, heave, sway), multi-axial rotational movement data (roll, pitch, yaw) and so forth. The sensors (102a, 104a) can be mounted at suitable surface points or joints of assets (102, 104) or attachments to enable collection of these types of data.

In some implementations, instead of or in addition to performing on-board or edge operations, the telematics server 110 can collect, via the controller (102b, 104b), raw or preprocessed sensor readings. Using raw or preprocessed sensor (102a, 104a) data, the telematics server 110 can generate electronic API messages 110b and transmit the electronic API messages 110b to target computing system(s) 120.

The target computing system(s) 120 can include various executables 120a structured to enable management and analytics of data about the assets (102, 104). For example, the executables 120a can enable sensor monitoring, safety monitoring, real-time or substantially real-time communication, detection of operating conditions, monitoring of mileage, monitoring of fuel consumption, monitoring of weather conditions, wear and tear monitoring, load monitoring and so forth. In some implementations, the target computing systems 120 can include AI/ML applications, which can be trained to generate predictions based on the input data received, in the form of API messages 110b and/or from other systems, by the target computing system(s) 120. For example, the AI/ML applications can be trained to generate predictions for operating condition prediction, object position prediction, and/or prediction of values and operating scenarios using other operating parameters of a particular asset (102, 104) or fleet 106.

Signal Evaluation Platform for Machine Sensor Obstruction Detection

Figure 2A:
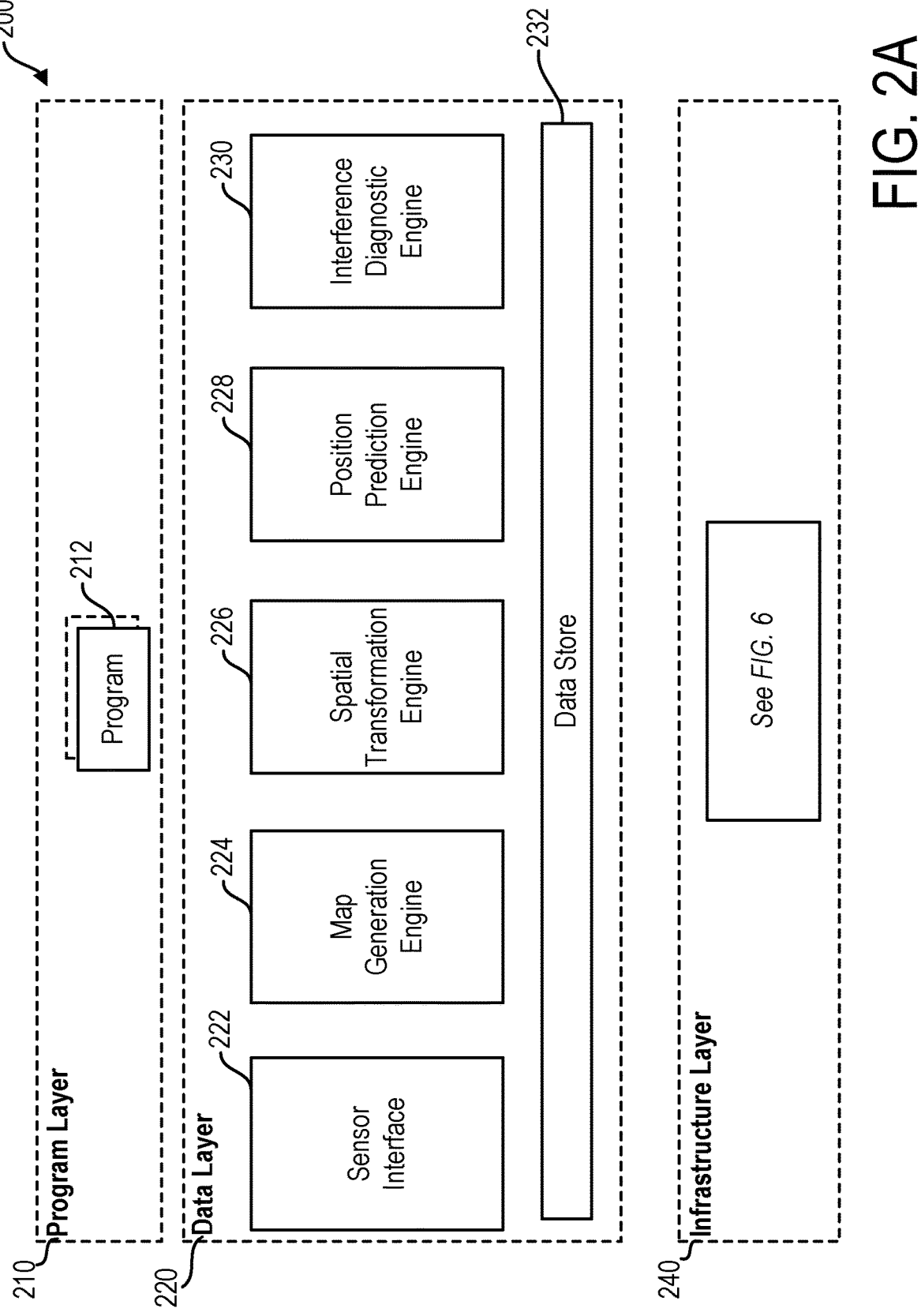
FIG. 2A shows an example signal monitoring system including a signal evaluation platform.

FIG. 2A shows an example signal monitoring system 200 including a signal evaluation platform. The signal monitoring system 200 enables receipt, detection, and evaluation of obstructions, interference, or other faults associated with sensors of a given asset (e.g., a machine, such as an excavator) based on sensor data reconciliation. For example, the signal monitoring system 200 can be utilized to execute various operations of the ecosystem 100 of FIG. 1, including sensor data processing, map generation, spatial transformation, object position prediction, and sensor interference diagnostic generation. To that end, the signal monitoring system 200 enables detection of obstructions, such as leaves, dirt, scratches, or other clear, opaque, or translucent occlusions, as well as evaluation of the regions of a given sensor that can be affected by the obstruction. As such, the signal monitoring system 200 enables timely intervention (e.g., clearing or curing of obstructions), thereby improving the safety and effectiveness of object detection associated with heavy machinery.

The signal monitoring system 200 can be deployed in a cloud-based or on-premises manner. In some implementations, multiple instances of the sensor monitoring system 200 can be deployed in a software-as-a-service (SaaS) mode. Such instances of the sensor monitoring system 200 can share various physical and/or virtualized computing resources, such as storage, memory, and/or processors. Additionally or alternatively, in certain arrangements, one or more components of the signal monitoring system 200 can be implemented on-board of the host equipment (e.g., as part of the controllers (102b, 104b)). Accordingly, one of skill will appreciate that operations described herein can be performed, in whole or in part, locally or remotely in relation to the host piece of equipment. Furthermore, the operations described herein can be performed locally or in a distributed fashion with respect to the quantity and geographical location of computer processors utilized to perform the operations.

As shown according to an example of FIG. 2A, the signal monitoring system 200 includes a program layer 210, a data layer 220, and an infrastructure layer 240. Together, these layers form a signal monitoring system 200 stack, which includes particularly configured hardware and software components structured to enable computer-based operations of the sensor monitoring system 200.

The program layer 210 can include one or more programs 212. The programs 212 can include on-board executables or circuitry, web-based applications, desktop applications, and/or mobile applications and can enable the signal monitoring system 200 to be accessible from a variety of computing devices, including on-board computers, desktop computers, smartphones, tablets, diagnostic devices (e.g., on-board diagnostics (OBD) code readers and/or scan tools), and so forth. The programs 212 can be structured to perform various tasks that access on-board sensor data and/or use telematics data, for example, in the form of API messages 110b of FIG. 1. For instance, the programs 212 can be structured to perform asset safety monitoring (e.g., through object detection using various sensor images associated with the asset), bidirectional asset communication, detection of asset operating conditions, monitoring of asset mileage, monitoring of asset fuel consumption, monitoring of weather conditions in a particular asset deployment area, asset wear and tear monitoring, asset load monitoring, asset performance modeling (e.g., via digital twin techniques) and so forth. In various implementations, the programs 212 can be deployed and/or managed by an OEM associated with a particular asset, a customer of the OEM (e.g., a dealer), and/or a third party relative to the OEM and/or the customer of the OEM.

The data layer 220 can include various engines and/or data stores that enable data services and/or data access. Generally, various engines at the data layer 220 execute operations that organize, manage, share, compute, and/or enhance various data items, such as sensor data, configuration data, API message items, organization data, asset data and so forth (including synthetic data), which are stored in the data store(s) 232. The engines can include executables that enable data generation, processing, analytics, storage, retrieval, and/or visualization. The data store(s) 232 can be implemented in various suitable forms, such as look-up tables or other data structures encoded in on-board memory units, local file systems, network file systems (NFS), database management systems (DBMS), relational DBMS, database file systems (DBFS), distributed ledgers, and so forth. Units of data in the data store(s) 232 can be stored in various forms, such as files (e.g., .xml, .json), database tables, and/or distributed ledger blocks. As such, the data store(s) 232 can utilize various data storage techniques, including file storage, object storage, content-addressed storage, and/or block storage.

As shown, example engines at the data layer 220 can include a sensor interface 222, a map generation engine 224, a spatial transformation engine 226, a position prediction engine 228, and/or an interference diagnostic engine 230. One of skill will appreciate that the engines and/or components thereof can be combined and/or omitted, according to various implementations. Additionally or alternatively, the engines can include on-board circuitry and/or executables. In such implementations, the infrastructure layer 240 can include on-board components, such as memory, processors, and so forth.

The sensor interface 222 enables the retrieval, generation, and/or communication of data associated with sensors. To illustrate, the sensor interface 222 can receive data associated with cameras, lidar components, radar components, or other sensors. For example, the sensor interface 222 can receive sensor maps (e.g., images) associated with CCDs of cameras attached to a machine (e.g., an asset). In some implementations, the sensor interface 222 receives associated time information (e.g., timestamps of times at which a given sensor map/image is generated), as well as field-of-view information (e.g., information relating to the position, orientation, and/or views relating to a given sensor). In some implementations, the sensor interface 222 can generate commands or prompts for communication to given sensors (e.g., to request generation of a sensor map or for updates thereof). Additionally or alternatively, the sensor interface 222 can generate termination or initiation commands to particular sensors associated with an asset, such as based on the detection of obstructions (and/or the clearing of obstructions).

Figure 2B:
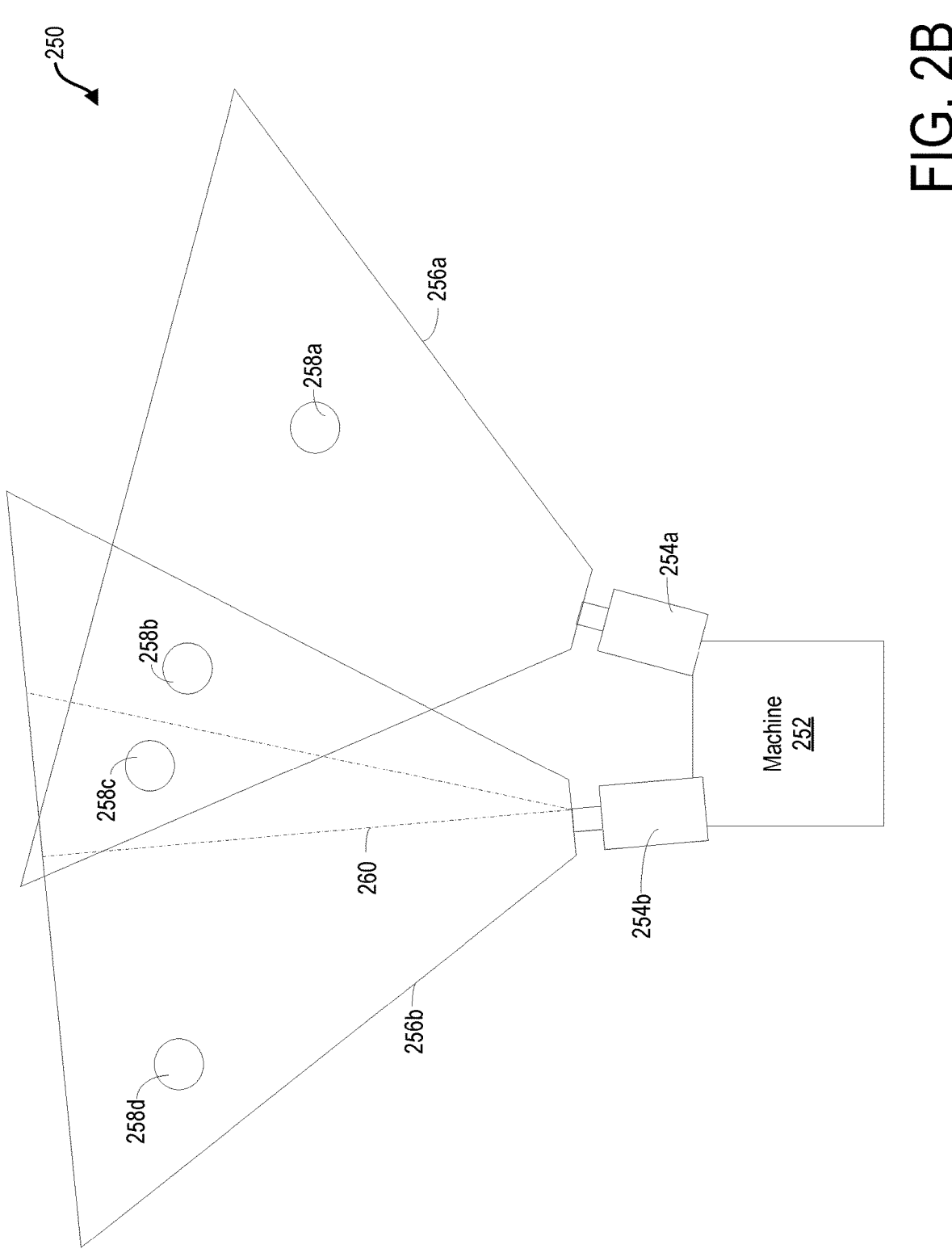
FIG. 2B shows a schematic of fields of view associated with sensors for detection of objects.

FIG. 2B shows a schematic 250 of fields of view associated with sensors for detection of objects. For example, FIG. 2B shows a schematic of a top-down view of machine 252 with sensor 254a and 254b (e.g., where these sensors are operable to monitor objects within a vicinity of the machine 252). The schematic 250 depicts fields of view 256a and 256b associated with the sensors 254a and 254b respectively. For example, objects 258a, 258b, and 258c are within a spatial region associated with the field of view 256a, while objects 258b, 258c, and 258d are within a spatial region associated with the field of view 256b. As an illustrative example, the sensor 254b includes a blocked portion of the field of view 260 such that the object 258c is not detectable at the sensor 254b, while this object is detectable at sensor 254a. The signal evaluation platform disclosed herein enables detection and/or evaluation of obstructions and/or interference associated with sensors (e.g., associated with the sensor 254b) on the basis of reconciliation of sensor maps and images of other sensors that are associated with the given asset (e.g., the machine 252).

A field of view includes an indication of a range of an observable space visible through a given camera, detector and/or another suitable sensor. For example, a field of view includes a solid angle through which a detector is sensitive to electromagnetic radiation. In some implementations, a field of view includes a maximum distance (e.g., a range distance) associated with a depth for which the detector or sensor is sensitive. A field of view can include an indication of a volume detectable to a given sensor within space (e.g., as defined by a parametrized surface within a suitable coordinate system, where the parametrized surface encompasses the volume that is detectable at the sensor). For example, field of view 256*a*, as depicted within FIG. 2B, can include a conical (cut or un-cut) volume associated with a solid angle, corresponding to the field-of-view. In some implementations, the field of view associated with a given sensor can change dynamically over time with respect to the reference frame and/or with respect to a reference frame of the object (e.g., due to rotation or movement of the machine and/or the sensor with respect to the machine). The signal evaluation platform can account for these movements by recording field of view information associated with the sensors over time (e.g., by updating the field of view information at a second time).

In some implementations, the signal evaluation platform can receive (e.g., through the sensor interface 222) an indication of a field of view (e.g., field-of-view information) of the associated sensor. Additionally or alternatively, the signal evaluation platform generates an indication of the field of view based on information from the sensor (e.g., through the sensor interface 222). For example, the signal evaluation platform receives an indication of a spatial position of the sensor and an associated orientation (e.g., corresponding to Euler angles from a pre-determined axis) with respect to a reference frame. Based on this information, the signal evaluation platform can determine a spatial volume associated with detectability of objects by the associated sensor.

A reference frame can include an indication of a coordinate system (e.g., including an origin) associated with the sensor monitoring system 200. For example, the reference frame includes a Euclidean coordinate system with a point associated with the machine (e.g., the machine 252) associated with the origin of the Euclidean coordinate system. One or more particular directions in space (e.g., associated with geometrical features, such a surfaces, of the machine 252) can be indicated as axes (e.g., three orthogonal axes) of the reference frame, with distances along such axes indicating associated coordinates with respect to the origin. In some implementations, the field-of-view information includes an indication of a position of the sensor (e.g., the sensor 254*a* or 254*b*) within this reference frame (e.g., with x, y, and z coordinates corresponding to distances from the origin with respect to two horizontal and one vertical axis respectively), in addition to the associated solid angle information of the sensor's field of view. By generating field-of-view information with respect to a reference frame, the signal evaluation platform enables comparison, evaluation, and/or reconciliation of sensor data from various sensors associated with a given machine, even if such sensors have differing fields of view (e.g., due to differing positions and/or orientations with respect to the machine).

FIG. 2C shows an example 270 of generated sensor maps 272 and 282 for a sensors with different fields of view (e.g., a first sensor and a second sensor respectively). For example, the generated sensor map 272 can correspond to information associated with the sensor 254*b* of FIG. 2B, while the generated sensor map 282 can correspond to information associated with the sensor 254*a* of FIG. 2B. The sensor map 272 can include an image consistent with the field of views associated with the respective sensors, and can include representations 274*a*, 274*b*, 284*a*, 284*b*, or 284*c* of objects (including background object 278 or 286), as well as obstructed portion 276 of a given sensor. By receiving and/or generating sensor maps, the signal evaluation platform enables detection of such obstructed and/or faulty portions of sensors, thereby enabling detection and subsequent mitigation of blocked views associated with given equipment.

The signal monitoring system 200 can include a map generation engine 224 for generation of signal maps associated with sensors. In some implementations, the map generation engine 224 can reside within one or more sensors. Additionally or alternatively, the map generation engine 224 resides within the signal evaluation platform of the signal monitoring system 200. For example, sensors 254*a* or 254*b* can generate sensor maps 272 or 282 respectively. A sensor map can include a geometric and/or spatial representation of sensor data (e.g., a set of values associated with respective sensor cells). For example, a sensor map includes a map of pixel values associated with an image captured at a sensor (e.g., where each pixel value indicates a light intensity at a corresponding transistor within a CCD). A sensor map can include structured (and/or unstructured) data associated with spatial coordinates associated with sensor components (e.g., individual pixels). As such, a sensor map can include a 2D representation of light that is incident at the sensor. Additionally or alternatively, a sensor map can include any other suitable spatial representation of objects or features (e.g., within a vicinity of the machine 252 of FIG. 2B). For example, a sensor map includes a radar map indicating objects or points associated with reflection of radiation (e.g., as expressed in a polar coordinate system). As such, a sensor map provides information associated with objects in a vicinity of the machine 252, enabling evaluation of possible defects or obstructions associated with sensors (e.g., if objects known to exist are not suitably detected).

The sensor map can include values associated with sensor cells. A sensor cell can include a physical representation of a unit of the sensor map. For example, a sensor cell corresponds to a pixel associated with a CCD-based camera (e.g., a particular illumination value of the associated camera at a particular pixel of the CCD). A sensor cell, as such, can represent a position of a given sensor map (e.g., a 2D position upon a sensor map corresponding to a camera's image). Particular sensor cells can be obstructed (e.g., by dirt, leaves, or other such blockages); the signal evaluation platform described herein enables detection and/or evaluation of such blockages, such as through identification of particular sensor cells affected by the blockage.

The signal evaluation platform can detect objects based on the generated/received sensor maps. For example, the signal evaluation platform enables detection of an object 258*a* through determination of a representation 284*b* of the object within a respective sensor map (e.g., the sensor map 282). An object can include a person, landmark, physical object, reflection, a piece of equipment, and/or a portion of the machine itself. The object can include any object that is visible or detectable to a given sensor. A representation of an object can include a set of pixels associated with a given object. For example, a representation of an object 274 is associated with an indication of set of pixels within the sensor map 272 that are consistent with the visual properties of the corresponding object 258*d* (e.g., as represented in FIG. 2B). In some implementations, the signal evaluation platform provides the sensor map to an image detection algorithm (e.g., an associated machine learning model or artificial neural network) for detection and/or determination of sensor cells associated with a particular object. By detecting particular sensor cells that are associated with a particular object, the signal evaluation platform enables further evaluation of potential blockages associated with sensors (e.g., in the event that a particular object detected in one sensor is not visible in another sensor's sensor map at the predicted location).

The spatial transformation engine 226 of the signal monitoring system 200 (e.g., as shown in FIG. 2A) enables transformation of spatial information associated with a sensor's sensor map with spatial information with respect to a reference frame (e.g., with respect to a position and/or orientation of the associated machine). For example, the signal evaluation platform, through the spatial transformation engine 226 can determine, based on the field-of-view information of a given sensor, a position of the object (e.g., with respect to the reference frame). For example, the signal evaluation platform can determine a position of the object (or a range of positions associated with the object) within the Euclidean coordinate system (e.g., through which the field-of-view information is expressed). As an illustrative example, the signal evaluation platform can determine a location of the object with respect to three defined axes associated with the reference frame. In some implementations, the signal evaluation platform determines a representation of the object's 3D position (e.g., in the case of an object of a finite size).

The position prediction engine 228 enables prediction of object positions (e.g., with respect to the reference frame) on the basis of field-of-view and sensor map information. The signal evaluation platform, through the position prediction engine 228, can determine the object's position on the basis of information within a sensor map from a sensor. In some implementations, the signal evaluation platform enables determination of an object position based on determining and/or retrieving dimensions associated with the object (e.g., a height, width, and/or length). For example, the signal evaluation platform can detect an object that corresponds to a ruler and determine that the ruler is of a particular length. Based on comparing the footprint of the ruler within the sensor map associated with a given sensor, the signal evaluation platform determines a distance of the ruler from the sensor, as well as an angular position (e.g., with respect to the associated sensor's field of view). Based on this field of view information and the distance, the signal evaluation platform can determine a position associated with the ruler (and/or another object for which a dimension is known, such as a background object 278 or 286). In some implementations, the position prediction engine 228 can determine the position of an object with respect to a reference object's position and/or orientation. For example, the position prediction engine 228 can use known information relating to the position of the background object 278, including its orientation and position with respect to the reference frame associated with the machine. Based on this information, the position prediction engine 228 can estimate the position of another object (e.g., the object associated with representation 284a).

In some implementations, the signal evaluation platform enables determination of an object position based on detecting the same object within another sensor associated with the asset. For example, the signal evaluation platform detects a second representation of the object within a third sensor map associated with a third sensor. Based on this detection, the signal evaluation platform can determine and/or triangulate a location of the object with respect to a shared reference frame (e.g., based on third field-of-view information associated with the third sensor). As such, the signal evaluation platform can determine a position of an object based on reconciliation of data from multiple sensors.

In some implementations, the signal evaluation platform receives sensor maps over time (e.g., where each sensor map is associated with a given point in time). As such, the signal evaluation platform can determine any changes or updates within the representation of the object over time and, subsequently, can determine updated positions corresponding to the object over time. For example, in a situation where the object is moving with respect to the reference frame (e.g., in the case of a moving vehicle that is in the vicinity of the machine and/or a stationary object in the vicinity of the moving machine), the system can determine the updated position of the object over time. Doing so enables the system to more accurately evaluate and/or detect blockages associated with sensors based on such temporal data. For example, detecting a moving object enables more portions of a sensor map to be tested, enabling improved information associated with the operable or non-operable portions of a given sensor.

The interference diagnostic engine 230 enables determination and characterization of interference with the sensor. For example, on determining positions of objects (e.g., with respect to a reference frame of the machine), the signal evaluation platform (e.g., through the interference diagnostic engine 230) can determine a predicted sensor cell (e.g., a sensor cell at which a representation of the object is expected on another sensor map corresponding to another sensor). To illustrate, the signal evaluation platform can determine that, based on the determined position of the object (e.g., determined through information from a first sensor), a representation of the object is expected at a particular position on a sensor map associated with a second sensor. For example, the signal evaluation platform can detect a representation 284a of a first object within the sensor map 282. Based on this representation 284a, the signal evaluation platform can determine a predicted spatial position of the first object within the reference frame (e.g., through the spatial transformation engine 226). Furthermore, the signal evaluation platform can determine a detected sensor cell (or a group of sensor cells) within a sensor map for the second sensor (e.g., the sensor map 272) where the object is expected to be represented. By doing so, the signal evaluation platform enables evaluation of the accuracy and/or operability of portions of the second sensor based on whether the second sensor's associated sensor map includes the expected representation of the same object.

In some cases, the signal evaluation platform can determine that the predicted sensor cell is missing the representation of the object (e.g., or that the representation of the object is distorted or otherwise problematic). For example, the sensor map 272 can include a representation of another object (e.g., the obstructed portion 276 of FIG. 2C) instead of the predicted representation of the object 258b of FIG. 2B. The other object can include an unexpected obstruction to the sensor, such as a leaf, dirt, or another blockage. As such, by determining that the predicted sensor cell is missing a representation of the object, the signal evaluation platform can determine that the indicated sensor cell is not behaving as expected (e.g., not detecting objects as expected), thereby enabling the signal evaluation platform to evaluate the efficacy of the sensor for detection of objects.

In some implementations, the signal evaluation platform can determine a prediction of a second object position associated with the object based on information within the second sensor map. For example, the signal evaluation platform can determine a predicted object position (e.g., with respect to the reference frame) for the object 258b based on the representation 284b of the object within the first sensor map (e.g., the sensor map 282), as well as a predicted object position for the same object 258b based on the representation 274b of the object within the second sensor map (e.g., the sensor map 272). The signal evaluation platform can determine a distance (e.g., in units of distance, such as meters, feet, inches, or centimeters) between these two predicted object positions within the coordinate system of the reference frame, thereby representing an error in the accuracy of the predicted position. For example, the signal evaluation platform can determine that the distance between the two predicted object positions is greater than a threshold distance, thereby enabling a determination that this error in position predictions is greater than a particular threshold error. As such, the signal evaluation platform enables detection and mitigation of sensor errors associated with differences in detected positions (e.g., due to a blockage or an obstruction with a different refractive index that causes the bending of light incident on the sensor), thereby enabling more complete evaluation of the accuracy and operability of the sensor.

FIG. 2D shows an example 290 of a region of cells associated with sensor interference based on the sensor maps of FIG. 2C. For example, the signal evaluation platform can determine operation statuses for various sensor cells associated with the sensor. The signal evaluation platform can determine that particular pixels (e.g., sensor cells) of the second sensor are blocked, obstructed, or otherwise non-operational. As an illustrative example, the signal evaluation platform can determine a range (e.g., of x-coordinates or y-coordinates of the sensor map) associated with operability or inoperability of the sensor. For example, the signal evaluation platform determines a blocked region 294 of a representation of sensor cells for the second sensor (e.g., with respect to axes 292a and 292b of the representation of sensor cells, representing pixel positions). As such, the signal evaluation platform enables detection of obstructions or blockages associated with the sensor on the basis of reconciliation of information from other sensors associated with the machine, as well as generation of relevant information (e.g., which regions of the sensors include the blockage) for mitigation of the blockage.

The signal evaluation platform can determine a sensor operation status for a sensor based on detected objects (or an inability to detect expected objects) within the associated sensor map. For example, a sensor operation status indicates a range of operational or non-operational portions of the second sensor. Such a range can indicate a range of horizontal x-coordinates and/or vertical y-coordinates that are likely associated with a blockage or obstruction (e.g., based on a failure to detect a representation of an object expected to be at a particular set of sensor cells of the sensor). Additionally or alternatively, a sensor operation status includes a data structure indicating particular pixels of the sensor (e.g., particular sensor cells of the sensor) that are determined to be operable or inoperable. For example, the sensor operation status includes an array, where each element of the array includes a binary indicator associated with a corresponding pixel of the sensor's sensor map. Each such binary indicator can indicate an operational indicator (e.g., indicating whether the corresponding pixel is determined to be operable). As such, the signal evaluation platform enables evaluation of the sensor's signals to determine portions of the sensor that can be broken, obstructed, or otherwise faulty.

In some implementations, the sensor operation status can include a percentage interference metric associated with a percentage of the total field of view blocked due to the obstruction and/or inoperable portions of the sensor. For example, the signal evaluation platform can determine a percentage interference metric (e.g., corresponding to a ratio of a number of inoperable sensor cells/pixels to the total number of sensor cells within the sensor). As such, the signal evaluation platform can generate a metric that is indicative of an overall operation state of the sensor. For example, the signal evaluation platform compares the percentage interference metric with a threshold interference metric. Based on determining that the percentage interference metric is greater than (and/or equal to) this threshold interference metric, the signal evaluation platform can determine to transmit an indication of the sensor operation status (e.g., including a warning) to an operator or another administrator of the asset. As such, the signal evaluation platform can ensure that minor disturbances associated with the sensor (e.g., obstructions blocking an insignificant amount of the sensor) do not cause an interruption to the operation of the machine by the operator.

Figure 3A:
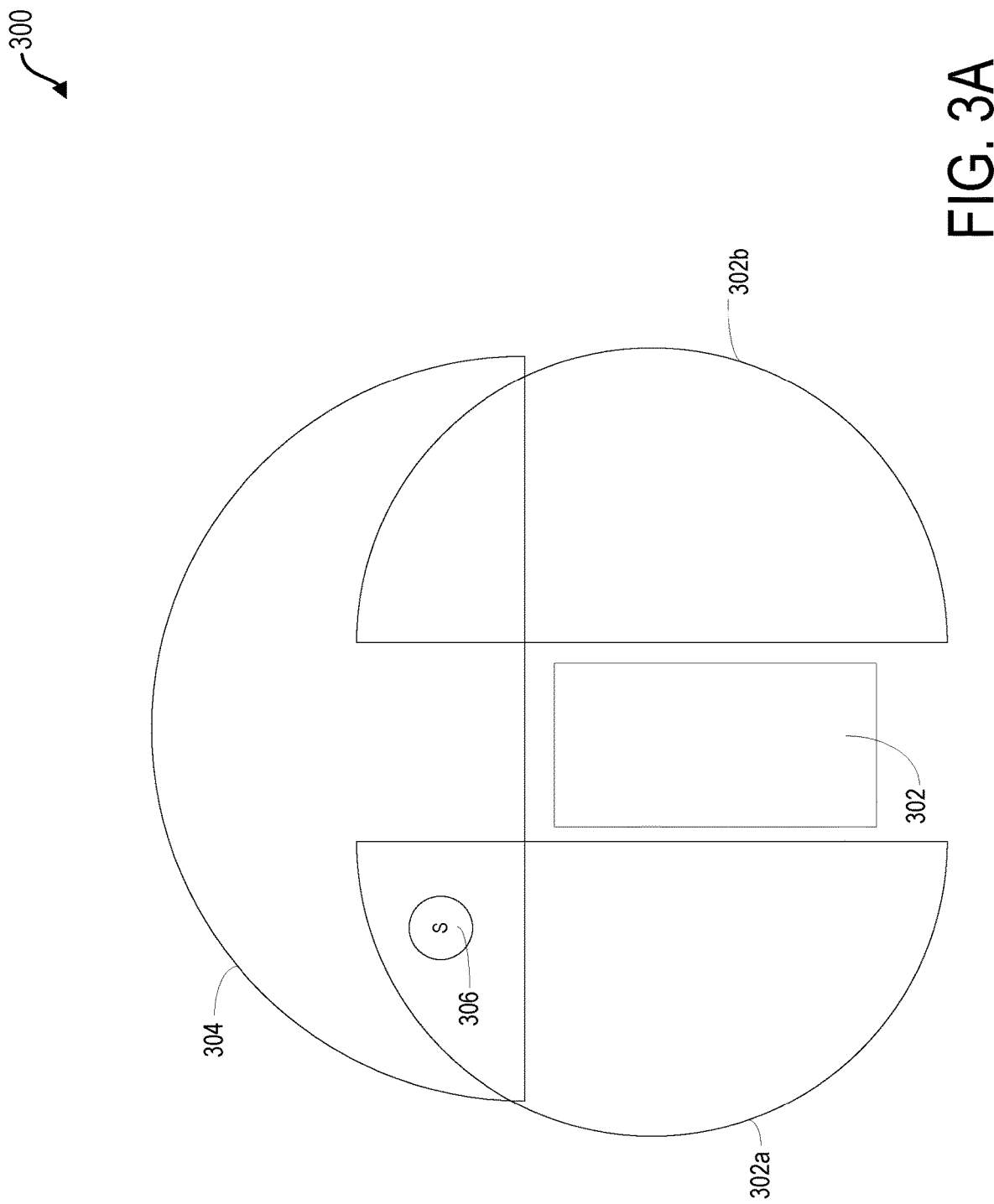
FIG. 3A shows a schematic of a stationary industrial machine with two sensors and a detected object.

FIG. 3A shows a schematic 300 of a stationary industrial machine with two sensors and a detected object. For example, the signal evaluation platform enables determination of sensor positions relative to each other, as well as the machine's position, in order to establish a local coordinate system (e.g., a reference frame) across these sensors. As such, the signal evaluation platform can determine fields of view associated with a first sensor (e.g., fields of view 302a and 302b), and of a second sensor (e.g., field of view 304) of a machine 302. The signal evaluation platform can attempt to detect an object 306 through both the first sensor and the second sensor. For example, the signal evaluation platform can compare detection information (e.g., positional tracks) for both sensors for a given amount of time. If the detection of the object is not present (and/or if the detected positions do not match), the signal evaluation platform can determine that a blockage is likely.

Figure 3B:
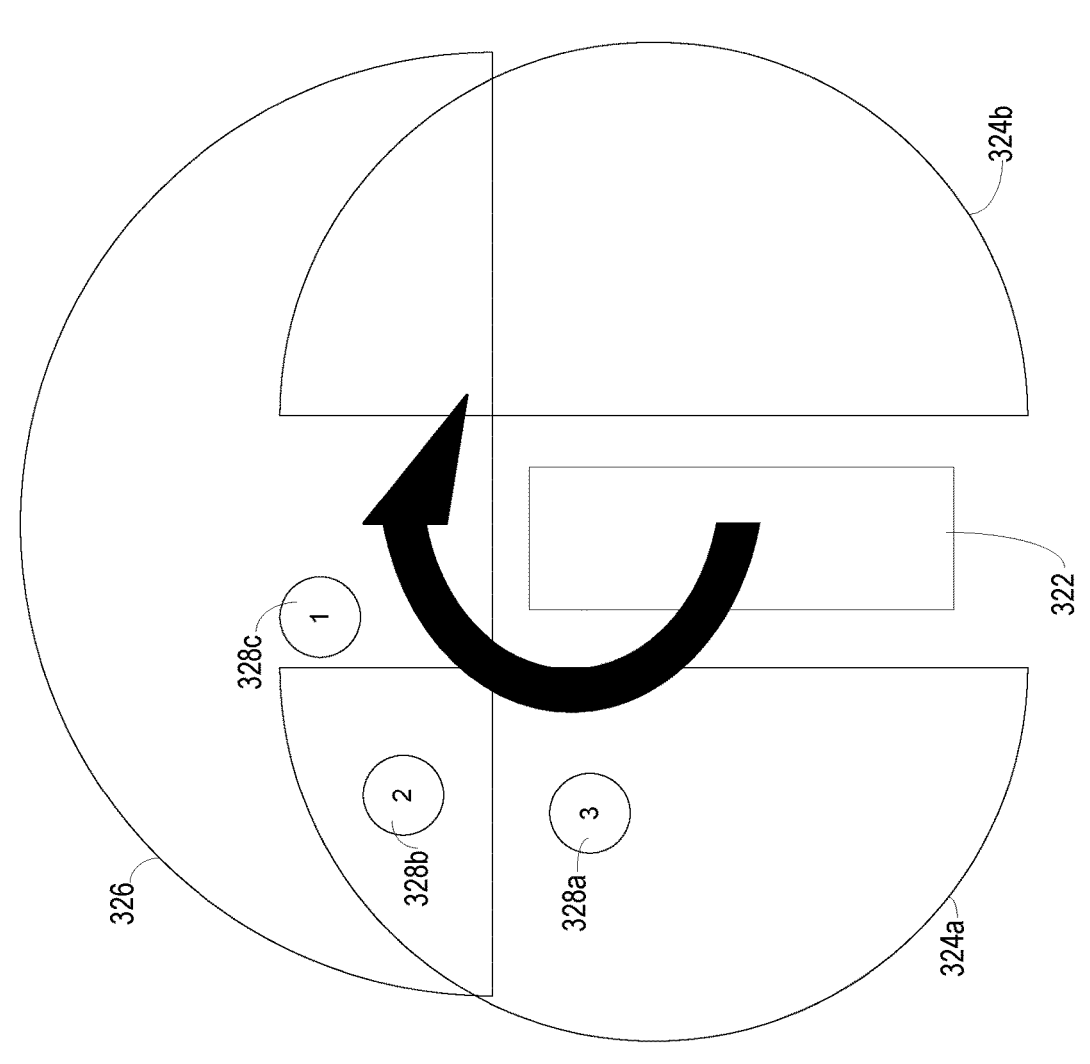
FIG. 3B shows a schematic of a mobile industrial machine with two sensors and a detected object.

FIG. 3B shows a schematic 320 of a mobile industrial machine with two sensors and a detected object. For example, the signal evaluation platform compares detection information (e.g., positional tracks) of a first sensor (e.g., with fields of view 324a and 324b) and a second sensor (e.g., with a field of view 326) for a given amount of time, where one or both sensors' fields of view are changing over time (e.g., due to rotation of the machine 322). For example, an object or person can be stationary within the sensors' fields of view, while the machine itself (and, therefore the sensors themselves) exhibit moving fields of view over time. The signal evaluation platform can detect the object at a first time at a position 328c, at a second time at a position 328b, and at a third time at a position 328a. The signal evaluation platform can account for the rotation and/or movement of the machine in determining an expected detection position for the object within one of the sensors. As such, the signal evaluation platform can determine situations where a particular object is not detected within one of the sensors over time, even if at a particular time the object is detected (e.g., due to rotation of the machine). As such, the signal evaluation platform can evaluate various portions of the sensors' cells based on the position of the object with respect to the sensors' fields of view over time due to the rotation of the machine.

FIG. 3C shows a schematic 340 of a mobile industrial machine with two sensors and a detected mobile object. For example, the signal evaluation platform compares detection information (e.g., positional tracks) of a first sensor (e.g., with fields of view 344a and 344b) and a second sensor (e.g., with a field of view 346) for a given amount of time, where one or both sensors' fields of view are changing over time (e.g., due to rotation of the machine 342). The object or person can move at a velocity with respect to the world's reference framer. For example, the signal evaluation platform detects the object at a first time at a position 348*c*, at a second time at a position 348*b*, and at a third time at a position 348*a*, with respect to the machine's reference frame. In some implementations, the signal evaluation platform can predict a path of the moving object or person based on a measured velocity over time (e.g., a measured speed and a heading/direction) based on a change in the object's position with respect to the reference frame over time.

For example, the signal evaluation platform can determine an object velocity, such as through a finite difference method between two predicted object positions corresponding to two points in time. Based on this object velocity (e.g., a measured speed and direction of movement), the signal evaluation platform can predict an extrapolated path of the first object (e.g., by assuming that the object is to continue with the same speed and direction of movement for the next set of points in time). Based on this predicted path, the signal evaluation platform can evaluate whether a sensor detects the object at the predicted position along this predicted path, thereby enabling evaluation of the operability of the sensor over time.

In some implementations, the signal evaluation platform can determine an elapsed interference time based on a first timestamp and a second timestamp, where a detected obstruction or blockage has persisted in the same predicted sensor cell between both times corresponding to the two timestamps. Based on comparing the elapsed interference time with a threshold interference time, the signal evaluation platform can determine to notify an administrator or operator of the blockage (e.g., generate the sensor operation status for display or transmission to a suitable entity and/or execute an interference diagnostic program). As such, the signal evaluation platform can avoid execution of the interference diagnostic program (e.g., avoid interrupting operation of the machine) in situations of transient blockages (e.g., if a leaf briefly blows into the sensor), thereby improving the efficiency and convenience of operation of the machine.

The signal evaluation platform can determine to and/or cause execution of an interference diagnostic program based on a detected blockage or obstruction (e.g., based on the sensor operation status). For example, the signal evaluation platform can generate a communication for communication to an operator of the machine indicating an operation status for the sensor (e.g., including a sensor identifier and/or an indication of the proportion of sensor cells that are inoperable and/or an indication of which sensor cells are inoperable). In some implementations, the signal evaluation platform can determine to terminate or initiate (e.g., turn off or turn on) a program associated with the sensor accordingly based on detection of an associated blockage. In some implementations, the signal evaluation platform can execute a program to physically clear a sensor (e.g., by causing operation of a set of wipers or a mechanical tool for clearing a given sensor). As such, the signal evaluation platform enables execution of interference diagnostic programs based on detection of inoperable portions of sensors associated with a machine (e.g., an excavator).

Methods of System Operation

FIG. 4 shows a flowchart 400 of a method for mitigating signal interference using the signal monitoring system and signal evaluation platform of FIG. 2A. A hardware or software processor executing instructions described in this application can perform the operations described herein. One of skill will appreciate that certain operations can be omitted, combined, and/or substituted without departing from the spirit of the invention.

As shown, at operations 402, the signal evaluation platform can generate a first sensor map. For example, the signal evaluation platform generates, using the first sensor, a first sensor map (e.g., corresponding to an image of pixels from a first camera attached to machinery). To illustrate, the signal evaluation platform can generate an image of objects and an associated background relating to an excavator or another asset for further evaluation of the operability of associated sensors.

As shown, at operations 410, the signal evaluation platform can generate a second sensor map using a second sensor. For example, the signal evaluation platform can generate an image of objects and an associated background relating to an excavator or another asset for evaluation of the operability of associated sensors. By including images from multiple sensors associated with the excavator, the signal evaluation platform enables determination and/or reconciliation of inconsistencies between captured images or sensor maps, thereby enabling the identification and/or determination of potential blockages or interference associated with the signal.

As shown, at operations 420, the signal evaluation platform can detect a first representation of a first object in the first sensor map. For example, the signal evaluation platform can detect, at a first sensor cell, a first representation of a first object in the first sensor map. As an illustrative example, the signal evaluation platform can determine the existence of an object (e.g., a person) in the vicinity of the excavator, such as through an image recognition algorithm.

As shown, at operations 430, the signal evaluation platform can obtain field-of-view information associated with the first sensor and the second sensor. For example, the signal evaluation platform can obtain first field-of-view information associated with the first sensor and second field-of-view information associated with the second sensor. As an illustrative example, the signal evaluation platform can obtain information relating to the spatial volume that is able to be detected by the respective sensors, enabling the signal evaluation platform to determine objects' positions on the basis of the orientation and position of the signals.

As shown, at operations 440, the signal evaluation platform can generate a prediction for an object position of the first object. For example, using the first sensor cell, the first field-of-view information, and the second field-of-view information, the signal evaluation platform can generate a prediction for an object position for the first object, wherein the prediction for the object position is based at least in part on a three-dimensional position of the first object in a reference frame. As an illustrative example, the signal evaluation platform can determine a position associated with the first object with respect to a reference frame common to or transformable from the first sensor's field of view and the second sensor's field of view. By doing so, the signal evaluation platform enables reconciliation and/or comparison of object positions between the sensors associated with the machine, thereby enabling detection of inconsistencies (and, therefore, potential blockages, obstructions and/or interferences) associated with the sensors.

As shown, at operations 450, the signal evaluation platform can determine a predicted sensor cell for the first object in the second sensor map. To illustrate, the signal evaluation platform can determine an expected position on the sensor map (e.g., pixel map) associated with the second sensor where the object is expected, based on the predicted position of the object based on the first sensor. As such, the signal evaluation platform enables prediction of inconsistencies within sensors on the basis of whether an object is consistently found across the various sensors associated with the machine.

In some implementations, the signal evaluation platform can determine the predicted object position based on a reference object's position and the reference object's orientation. For example, the signal evaluation platform determines a reference object position and a reference object orientation, where the reference frame is based on the reference object position and the reference object orientation. Using the reference object position and the reference object orientation, the signal evaluation platform can determine the object position for the first object with respect to the reference frame.

As shown, at operations 460, the signal evaluation platform can determine that the second sensor map does not include the second representation of the object. For example, the signal evaluation platform determines that the second sensor map, at the predicted sensor cell, does not include a second representation of the first object. As an illustrative example, the sensor evaluation platform determines that a representation of the object (e.g., an image of the object) is not at a predicted location within the second sensor's output (e.g., the second sensor's image). As such, the signal evaluation platform can detect an inconsistency in the second sensor that could correspond to a blockage and/or other signal interference phenomenon.

In some implementations, the signal evaluation platform can predict the object's position based on its velocity in the reference frame. For example, the signal evaluation platform can determine, in the reference frame, a velocity associated with the first object. The signal evaluation platform can generate, using the velocity, an extrapolated path of the first object. The signal evaluation platform can determine the predicted sensor cell based on a position of the extrapolated path.

As shown, at operations 470, the signal evaluation platform can generate a sensor operation status that indicates a range of operational or non-operational portions of the second sensor. For example, in response to determining that the second sensor map does not include the second representation of the first object, the signal evaluation platform can generate a sensor operation status, wherein the sensor operation status indicates a range of operational or non-operational portions of the second sensor. As an illustrative example, the signal evaluation platform can determine which pixels of the second sensor map are likely obstructed or blocked, including a percentage of the sensor that can be affected. As such, the signal evaluation platform enables generation of diagnostic information with respect to any issues associated with the sensor, thereby improving the process of troubleshooting and curing the sensor of the associated fault.

In some implementations, the signal evaluation platform can generate an indication of non-operational portions of the signal (e.g., through determination of associated ranges of horizontal or vertical coordinates). For example, the signal evaluation platform can determine that the non-operational portions of the second sensor include the predicted sensor cell. The signal evaluation platform can determine a range of horizontal and vertical coordinates associated with the second sensor, wherein the range of horizontal and vertical coordinates includes an indication of a blocked field of view. The signal evaluation platform can generate the sensor operation status to include the range of horizontal and vertical coordinates.

As shown, at operations 480, the signal evaluation platform can execute an interference diagnostic program according to the sensor operation status. For example, the signal evaluation platform can determine to transmit an indication of the operation status of the sensor (e.g., which proportion and/or which sensor cells are affected by the obstruction/blockage) for further mitigation. To illustrate, the signal evaluation platform can directly or indirectly cause clearing of the blockage or obstruction (e.g., by operation of a clearing apparatus or device, such as wipers, and/or through transmission of a warning message to an operator indicating the sensor and/or the sensors' pixels that require attention).

In some implementations, the signal evaluation platform can receive another sensor map at a second time for determination of potential obstructions based on the object's position within the reference frame over time. For example, the signal evaluation platform receives a third sensor map from the second sensor at a second time. The signal evaluation platform can determine an updated predicted sensor cell of the first object, where the updated predicted sensor cell indicates an updated position of the first object in a third frame associated with the second sensor at the second time. The signal evaluation platform can determine that the third sensor map, at an updated predicted sensor cell of the first object, does not include a third representation of the first object. In response to determining that the third sensor map does not include the third representation of the first object, the signal evaluation platform can generate the sensor operation status to include an indication of the updated predicted sensor cell.

In some implementations, the signal evaluation platform can update the predicted sensor cell based on an updated object position at the second time. For example, the signal evaluation platform can determine, at the second time, updated first field-of-view information associated with the first sensor. The signal evaluation platform can determine, at the second time, updated second field-of-view information associated with the second sensor. Using the updated first field-of-view information and the updated second field-of-view information, the signal evaluation platform can determine an updated object position for the first object at the second time. The signal evaluation platform can determine, in the third sensor map, the updated predicted sensor cell of the first object.

In some implementations, the signal evaluation platform can execute the interference diagnostic program based on determining an elapsed interference time. For example, the signal evaluation platform can determine a first timestamp associated with the first time and a second timestamp associated with the second time. The signal evaluation platform can determine an elapsed interference time associated with the first time and the second time. The signal evaluation platform can generate the sensor operation status based on the elapsed interference time. The signal evaluation platform can compare the elapsed interference time with a threshold interference time. In response to determining that the elapsed interference time is greater than the threshold interference time, the signal evaluation platform can execute the interference diagnostic program.

In some implementations, the signal evaluation platform can execute the interference diagnostic program in cases where there is an inconsistency in the predicted position of an object based on the first and second sensors. For example, the signal evaluation platform can generate a prediction for a second object position for the first object based on the second sensor. The signal evaluation platform can determine a distance between the prediction for the object position and the prediction for the second object position. The signal evaluation platform can compare the distance with a threshold distance. In response to determining that the distance is greater than the threshold distance, the signal evaluation platform can execute the interference diagnostic program.

Example Computer Systems and Networks

Figure 5:
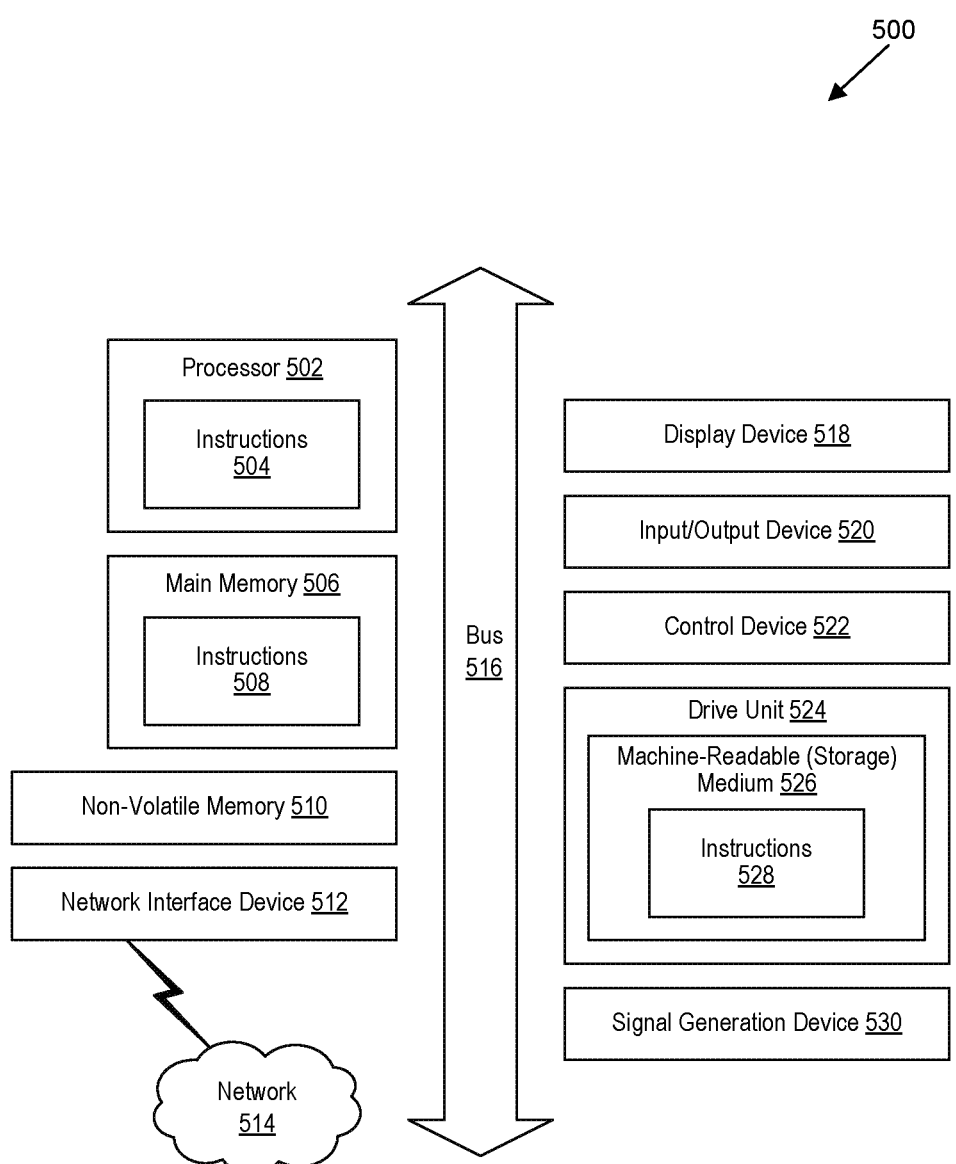
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the Figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computer system 500 to perform operations to execute elements involving the various aspects of the disclosure.

Figure 6:
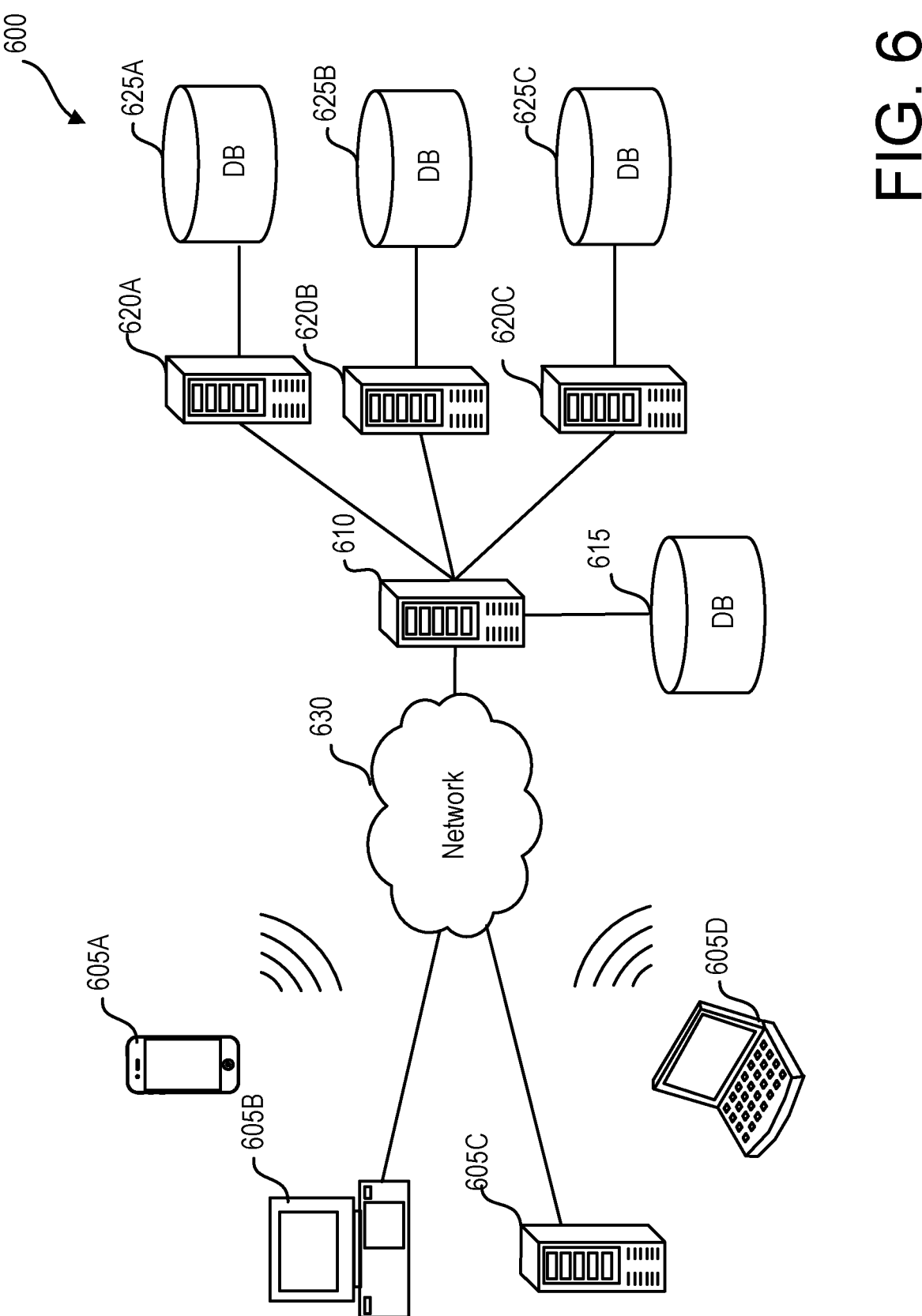
FIG. 6 is a system diagram illustrating an example environment in which the platform operates in some implementations.

FIG. 6 is a system diagram illustrating an example of a computing environment in which the disclosed platform operates in some implementations. In some implementations, environment 600 includes one or more client computing devices 605A-D, examples of which can host systems described herein. Client computing devices 605 operate in a networked environment using logical connections through network 630 to one or more remote computers, such as a server computing device.

In some implementations, server 610 is an edge server which receives client requests and coordinates fulfillment of those requests through other servers, such as servers 620A-C. In some implementations, server computing devices 610 and 620 comprise computing systems, such as the target computing system 120 of FIG. 1, the system 200 of FIG. 2A, and so forth. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server or client devices. In some implementations, servers (610, 620A-C) connect to a corresponding database (615, 625A-C). As discussed above, each server 620 can correspond to a group of servers, and each of these servers can share a database or can have its own database. Databases 615 and 625 warehouse (e.g., store) information such as scheduler engine data, dataset cloning engine data, organization data, asset data, fleet data, API message generator data and so forth. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. In some implementations, network 630 is the Internet or some other public or private network. Client computing devices 605 are connected to network 630 through a network interface, such as by wired or wireless communication. While the connections between server 610 and servers 620 are shown as separate connections, these connections can be any kind of local, wide area, wired, or wireless network, including network 630 or a separate public or private network.

INDUSTRIAL APPLICABILITY

Systems and methods are disclosed herein for mitigation of sensor obstructions or interference. The system can generate a first sensor map using a first sensor and a second sensor map using a second sensor. The system can detect a first representation of a first object in the first sensor map. The system can obtain first field-of-view information associated with the first sensor and second field-of-view information associated with the second sensor. The system can generate a prediction for an object position of the first object. The system can determine, in the second sensor map, a predicted sensor cell for the first object. The system can determine that the second sensor map does not include a second representation of the object. The system can generate a sensor operation status for the second sensor. The system can execute an interference diagnostic program according to the sensor operation status.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system for mitigating sensor interference in an industrial machine, the system comprising:

a first sensor;

a second sensor;

at least one processor;

at least one memory; and one or more non-transitory, computer-readable storage media storing instructions, which, when executed by the at least one processor, cause the system to:

generate, using the first sensor, a first sensor map;

generate, using the second sensor, a second sensor map;

detect, at a first sensor cell, a first representation of a first object in the first sensor map;

obtain first field-of-view information associated with the first sensor and second field-of-view information associated with the second sensor;

using the first sensor cell, the first field-of-view information, and the second field-of-view information, generate a prediction for an object position for the first object, wherein the prediction for the object position is based at least in part on a three-dimensional position of the first object in a reference frame;

determine, in the second sensor map, a predicted sensor cell for the first object;

determine that the second sensor map, at the predicted sensor cell, does not include a second representation of the first object;

in response to determining that the second sensor map does not include the second representation of the first object, generate a sensor operation status, wherein the sensor operation status indicates a range of operational or non-operational portions of the second sensor; and execute an interference diagnostic program according to the sensor operation status.

2. The system of claim 1, wherein the instructions for generating the sensor operation status cause the system to:

determine, using the second sensor, a plurality of cells associated with the second field-of-view information for the second sensor;

generate, using the second sensor, a plurality of operation indicators for the plurality of cells; and generate, using the second sensor, the sensor operation status comprising the plurality of operation indicators.

3. The system of claim 2, wherein the instructions for generating the plurality of operation indicators cause the system to:

generate, for each particular cell of the plurality of cells and using the second sensor, an associated operation indicator, wherein the associated operation indicator comprises a binary value indicating whether the particular cell is operational.

4. The system of claim 2, wherein the instructions for generating the sensor operation status cause the system to:

determine, based on the plurality of operation indicators, a percentage interference metric for the second sensor, wherein the percentage interference metric indicates a blocked proportion of a second field of view of the second sensor; and generate the sensor operation status to include the percentage interference metric.

5. The system of claim 4, wherein the instructions for executing the interference diagnostic program cause the system to:

compare the percentage interference metric with a threshold interference metric; and in response to determining that the percentage interference metric is greater than the threshold interference metric, execute the interference diagnostic program for the second sensor.

6. The system of claim 1, wherein the instructions cause the system to:

generate, using the second sensor, a third sensor map at a second time;

determine an updated predicted sensor cell of the first object, wherein the updated predicted sensor cell indicates an updated position of the first object in a third frame associated with the second sensor at the second time;

determine that the third sensor map, at an updated predicted sensor cell of the first object, does not include a third representation of the first object; and in response to determining that the third sensor map does not include the third representation of the first object, generate the sensor operation status comprising an indication of the updated predicted sensor cell.

7. The system of claim 6, wherein the instructions for determining the updated predicted sensor cell cause the system to:

generate, at the second time and using the first sensor, updated first field-of view information associated with the first sensor;

generate, at the second time and using the second sensor, updated second field-of-view information associated with the second sensor;

using the updated first field-of-view information and the updated second field-of-view information, determine an updated object position for the first object at the second time; and determine, in the third sensor map, the updated predicted sensor cell of the first object.

8. The system of claim 6, wherein the instructions for executing the interference diagnostic program cause the system to:

determine a first timestamp associated with the first time and a second timestamp associated with the second time;

determine an elapsed interference time associated with the first time and the second time;

generate the sensor operation status based on the elapsed interference time;

compare the elapsed interference time with a threshold interference time; and in response to determining that the elapsed interference time is greater than the threshold interference time, execute the interference diagnostic program.

9. A method for mitigating sensor interference in an industrial machine, the method comprising:

receiving, at a first time, a first sensor map from a first sensor and a second sensor map from a second sensor;

detecting, at a first sensor cell, a first representation of a first object in the first sensor map, wherein the first sensor cell indicates a position of the first representation of the first object in a first frame associated with the first sensor;

obtaining first field-of-view information associated with the first sensor and second field-of-view information associated with the second sensor;

using the first sensor cell, the first field-of-view information, and the second field-of-view information, generate a prediction for an object position for the first object, wherein the prediction for the object position is based at least in part on a three-dimensional position of the first object in a reference frame;

determining, in the second sensor map, a predicted sensor cell for the first object;

wherein the predicted sensor cell indicates a position of the first object in a second frame associated with the second sensor;

determining that the second sensor map, at the predicted sensor cell, does not include a second representation of the first object;

in response to determining that the second sensor map does not include the second representation of the first object, generating a sensor operation status, wherein the sensor operation status indicates a range of operational or non-operational portions of the second sensor; and execute an interference diagnostic program according to the sensor operation status.

10. The method of claim 9, comprising:

receiving a third sensor map from the second sensor at a second time;

determining an updated predicted sensor cell of the first object, wherein the updated predicted sensor cell indicates an updated position of the first object in a third frame associated with the second sensor at the second time;

determining that the third sensor map, at an updated predicted sensor cell of the first object, does not include a third representation of the first object; and in response to determining that the third sensor map does not include the third representation of the first object, generating the sensor operation status to include an indication of the updated predicted sensor cell.

11. The method of claim 10, wherein determining the updated predicted sensor cell comprises:

determining, at the second time, updated first field-of-view information associated with the first sensor;

determining, at the second time, updated second field-of-view information associated with the second sensor;

using the updated first field-of-view information and the updated second field-of-view information, determining an updated object position for the first object at the second time; and determining, in the third sensor map, the updated predicted sensor cell of the first object.

12. The method of claim 10, wherein executing the interference diagnostic program comprises:

determining a first timestamp associated with the first time and a second timestamp associated with the second time;

determining an elapsed interference time associated with the first time and the second time;

generating the sensor operation status based on the elapsed interference time;

comparing the elapsed interference time with a threshold interference time; and in response to determining that the elapsed interference time is greater than the threshold interference time, executing the interference diagnostic program.

13. The method of claim 9, wherein determining the predicted sensor cell for the first object comprises:

determining, in the reference frame, a velocity associated with the first object;

generating, using the velocity, an extrapolated path of the first object; and determining the predicted sensor cell based on a position of the extrapolated path.

14. The method of claim 9, wherein generating the sensor operation status comprises:

determining that the non-operational portions of the second sensor include the predicted sensor cell;

determining a range of horizontal and vertical coordinates associated with the second sensor, wherein the range of horizontal and vertical coordinates includes an indication of a blocked field of view; and generating the sensor operation status to include the range of horizontal and vertical coordinates.

15. The method of claim 9, comprising:

generating a prediction for a second object position for the first object based on the second sensor;

determining a distance between the prediction for the object position and the prediction for the second object position;

comparing the distance with a threshold distance; and in response to determining that the distance is greater than the threshold distance, executing the interference diagnostic program.

16. The method of claim 9, wherein generating the prediction for the object position for the first object comprises:

determining a reference object position and a reference object orientation, wherein the reference frame is based on the reference object position and the reference object orientation; and using the reference object position and the reference object orientation, determining the object position for the first object with respect to the reference frame.

17. One or more non-transitory, computer-readable storage media storing instructions, which, when executed by at least one data processor of a computing system for mitigating sensor interference, cause the computing system to:

receive, at a first time, a first sensor map from a first sensor and a second sensor map from a second sensor;

detect, at a first sensor cell, a first representation of a first object in the first sensor map;

obtain first field-of-view information associated with the first sensor and second field-of-view information associated with the second sensor;

using the first sensor cell, the first field-of-view information, and the second field-of-view information, generate a prediction for an object position for the first object, wherein the prediction for the object position is based at least in part on a three-dimensional position of the first object in a reference frame;

determine, in the second sensor map, a predicted sensor cell for the first object;

determine that the second sensor map, at the predicted sensor cell, does not include a second representation of the first object;

in response to determining that the second sensor map does not include the second representation of the first object, generate a sensor operation status, wherein the sensor operation status indicates a range of operational or non-operational portions of the second sensor; and execute an interference diagnostic program according to the sensor operation status.

18. The one or more non-transitory, computer-readable storage media of claim 17, wherein the instructions cause the computing system to:

receive a third sensor map from the second sensor at a second time;

determine an updated predicted sensor cell of the first object, wherein the updated predicted sensor cell indicates an updated position of the first object in a third frame associated with the second sensor at the second time;

determine that the third sensor map, at an updated predicted sensor cell of the first object, does not include a third representation of the first object; and in response to determining that the third sensor map does not include the third representation of the first object, generate the sensor operation status to include an indication of the updated predicted sensor cell.

19. The one or more non-transitory, computer-readable storage media of claim 18, wherein the instructions for determining the updated predicted sensor cell cause the computing system to:

determine, at the second time, updated first field-of-view information associated with the first sensor;

determine, at the second time, updated second field-of-view information associated with the second sensor;

using the updated first field-of-view information and the updated second field-of-view information, determine an updated object position for the first object at the second time; and determine, in the third sensor map, the updated predicted sensor cell of the first object.

20. The one or more non-transitory, computer-readable storage media of claim 18, wherein the instructions for executing the interference diagnostic program cause the computing system to:

determine a first timestamp associated with the first time and a second timestamp associated with the second time;

determine an elapsed interference time associated with the first time and the second time;

generate the sensor operation status based on the elapsed interference time;

compare the elapsed interference time with a threshold interference time; and in response to determining that the elapsed interference time is greater than the threshold interference time, execute the interference diagnostic program.

* * * * *